Aug. 22, 1939.    E. R. FROST    2,170,556
PROCESS AND APPARATUS FOR MAKING RIVETS
Filed April 1, 1936    2 Sheets-Sheet 1
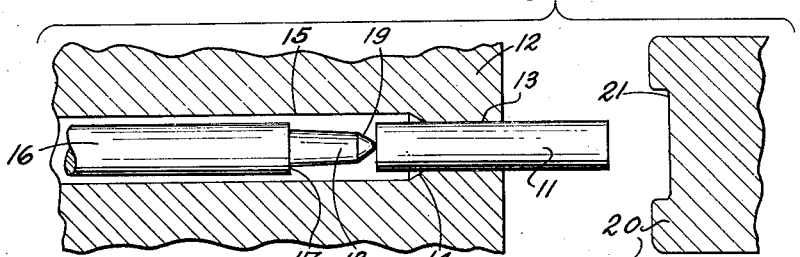
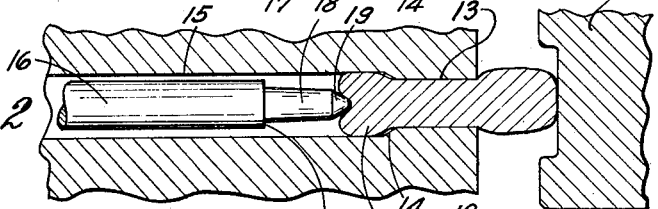
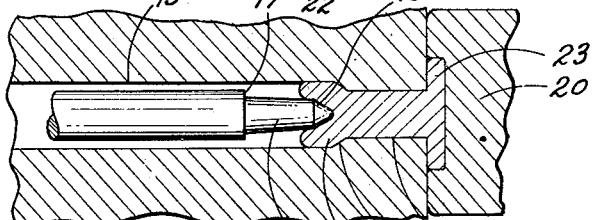
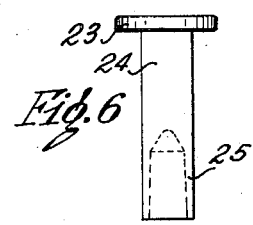
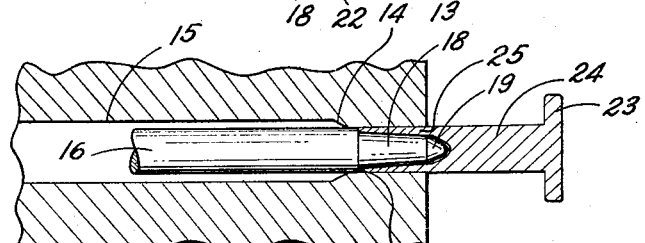
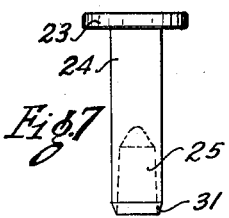
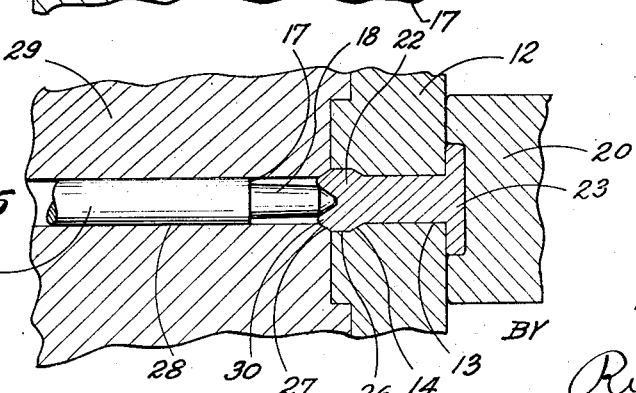
Inventor
EARL R. FROST
BY
Richey & Watts
Attorneys

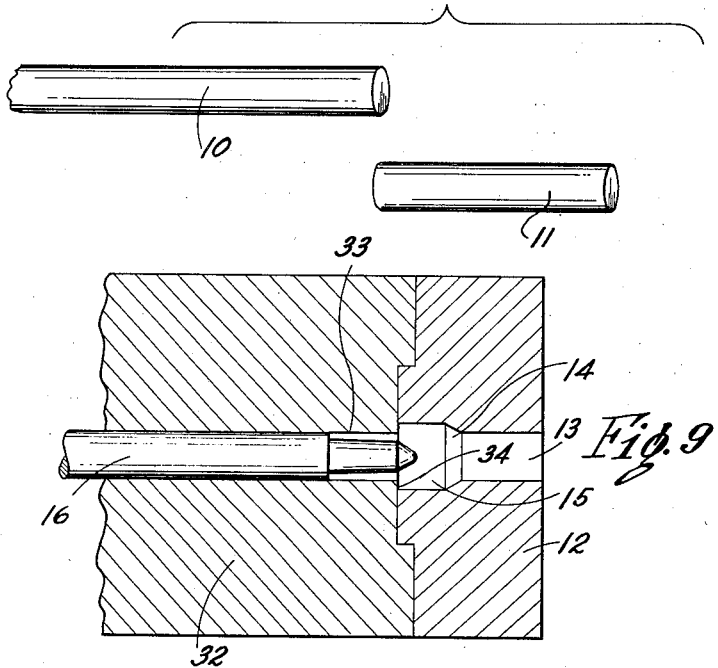
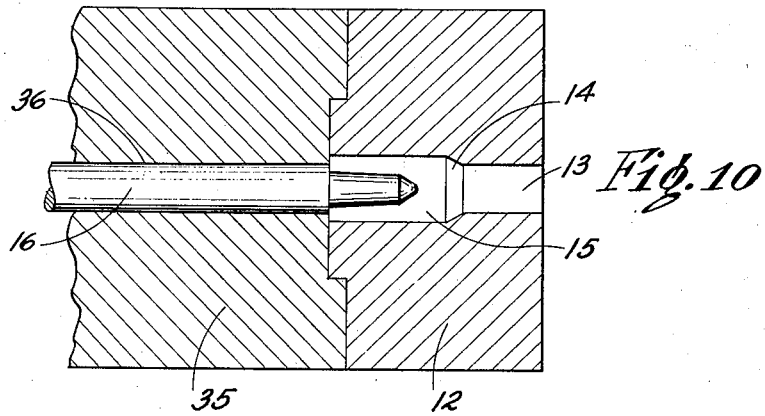

Patented Aug. 22, 1939

2,170,556

UNITED STATES PATENT OFFICE 2,170,556

PROCESS AND APPARATUS FOR MAKING RIVETS

Earl R. Frost, Tiffin, Ohio, assignor to The National Machinery Company, Tiffin, Ohio, a corporation of Ohio Application April 1, 1936, Serial No. 72,197

28 Claims. (Cl. 10—27)

This invention relates generally to the manufacture of metal articles with hollow or tubular shanks such as hollow rivets, and more particularly to a process and apparatus for making such articles by drawing or internal displacement or a combination of both.

Heretofore hollow rivets and the like have been commonly made by forming a head on a length of stock and drilling a recess in the shank. According to the present invention I upset a part of the shank into an enlarged space in a die, either simultaneously with heading or in a separate operation, and then eject the blank through a reduced throat at the forward end of the enlarged part of the die, thereby drawing a tubular portion at the end of the shank.

An important feature of the present invention is to upset the metal of the shank end in such a manner as to definitely limit the volume of metal upset so that the dimensions of the solid portion of the shank and the tubular portion of the shank may be accurately determined and maintained within a reasonable tolerance through a series of blanks, irrespective of the exact degree of hardness of the metal; and the provision of die and tool means for limiting and determining the volume of metal upset on the shank. This feature of my invention is of importance in accurately determining the shank dimensions in forming the tubular shank in a separate operation, and is of further advantage in that it permits the heading to be performed simultaneously with the upsetting of the shank since the extension of the blank into the die is limited by the volume of metal which can be upset on the shank and therefore a uniformly accurate volume of metal projects from the die to be upset into the head.

Another feature of the present invention is the upsetting of the metal of the end of the shank to a definitely limited diameter of such size with respect to the diameter of the blank as to permit drawing of the upset part of the shank when it is pushed out of the die without excessive friction or binding and without shearing off or otherwise mutilating any of the metal upset to the larger diameter.

Other objects and advantages of this invention will appear from the following detailed description of a preferred embodiment thereof. In the accompanying drawings:

Figure 1 is a sectional view through a die, heading punch and ejecting tool which may be used to carry out this invention showing a cut blank in position;

Figure 2 is a view of the parts shown in Figure 1 during the upsetting;

Figure 3 is a view corresponding to Figure 2 after the metal has been upset in the heading tool and the punch has moved forward;

Figure 4 is a view corresponding to Figures 2 and 3 showing the completed rivet being ejected after the tubular portion has been drawn or extruded;

Figure 5 is a view corresponding to Figure 4 showing a modification in the die structure;

Figure 6 is a side elevational view of a completed tubular rivet which may be produced by the present invention;

Figure 7 is a view corresponding to Figure 6 of a slightly modified rivet;

Figure 8 is a view of a length of stock with a blank cut therefrom;

Figures 9 and 10 are views of modified forms of dies.

In the drawings I have illustrated a die, heading tool and ejecting and drawing rod suitable for use in a conventional single stroke solid die cold header. Such a machine includes a frame with a die breast supporting a solid die, a reciprocating heading slide carrying a tool to upset a head upon a blank held in the die, a wire feed, a cut-off arranged to cut off a length of wire stock and carry the same into alignment with the die so that it may be pushed into the die by the header slide, and a knockout or ejector rod slidable within the die and operating to eject the headed blank during each receding movement of the header slide. Such machines are conventional and therefore the details of construction and operation have not been illustrated, since the same form no part of the present invention. While the simplicity of the present invention permits it to be used in this type of machine it will be understood that it is not limited to this simple form of header but may also be used if desired in double stroke or multiple station headers and the operations constituting the present invention may be combined, if desired, with other operations upon the blank.

Referring to the drawings the reference character 10 designates a length of wire stock or the like from which blanks 11 may be sheared by any desired cut-off mechanism and carried into alignment with the opening in the die. A die 12 is provided with a bore 13 at its forward face which is of a diameter to snugly receive the blank 11. Spaced from the forward face of the die the bore 13 is joined, by a tapered extrusion or drawing throat 14, to an enlarged substantially cylindrical bore 15.

Slidably supported to project into the bore 15 is an ejecting rod 16 which is arranged in its retracted position substantially as illustrated in Figure 1. The forward end of the ejecting rod 16 is formed with a shoulder 17 from which projects forwardly a slightly tapered punch 18 terminating in a suitable point 19. A heading tool 20 carried by the header slide is illustrated as formed with a head forming recess 21, although it will be understood, of course, that the head forming recess may be formed either in the heading tool or the die or partly in both of these members.

When the blank 11 is cut off and positioned in alignment with the bore 13 in the die 12 the heading tool 20 moves forward, engages the blank and pushes the same rearwardly into the die, the ejecting rod 16 being in its retracted position. As the blank 11 is pushed back into the die its rear end comes in contact with the point 19 upon the forward end of the punch 18. Continued rearward movement of the blank causes the rearward end of the blank to swell or upset into an enlargement 22, fairly well filling the bore 15 and fitting around the end 19 of the punch as illustrated in Figure 2. This operation takes place easily and naturally prior to the complete upsetting of the forward end of the blank into the head forming recess 21 because when pressure is exerted upon the ends of a cylindrical piece of metal the metal tends to spread uniformly at the point where the resistance to flow is least and substantially in line with the direction of the upsetting force. The area of the end 19 of the punch is made sufficiently large with respect to the diameter of the bore 15 to cause the metal of the blank to upset into engagement with the wall of the bore 15 before any tendency exists for the metal to extrude or crawl rearwardly between the side of the punch 18 and the wall of the bore 15.

While the metal is upsetting into engagement with the wall of the bore 15 the unsupported length projecting from the front face of the die 12 and in engagement with the heading tool 20 is likewise upset substantially the same amount as shown in Figure 2. The metal positioned in the bore 13 of the die, being subjected to the same pressure as the remainder of the blank, tends to swell against the wall of the bore 13. However, the length of the bore 13 is maintained sufficiently short with respect to the diameter of the blank 11 to permit the necessary metal to form the enlargement 22 to slide through the bore 13.

When the metal of the enlargement or upset 22 comes into engagement with the wall of the bore 15 sufficient resistance to the inward movement of the metal is provided by the friction of the bores 13 and 15 and the abutment of the punch 18 to substantially prevent further inward movement of the metal. During the remainder of the movement of the heading tool 20 toward the die 12, all of the upsetting or metal flow is confined to he portion of the blank projecting from the front face of the die 12, which is upset into the recess 21 to form a head 23 on the blank at the completion of the stroke. Any excess metal in the blank is thrown out as flash between the heading tool 20 and the die 12.

During the completion of the upsetting of the head from the condition shown in Figure 2 to that shown in Figure 3 the ejecting rod 16 is moved forwardly so that the punch end 19 presses into the metal of the enlargement 22 and upsets this metal by internal displacement to completely fill out the corners in the bore 15 and position the punch end 19 close to the drawing throat 14. Since the metal is moved by internal displacement or upsetting the metal does not extrude or crawl rearwardly within the bore 15.

Since the blank is firmly held and further inward flow is prevented when the enlargement 22 is formed, a definite volume of metal is contained in the enlargement 22, and consequently with a given blank length a definite volume is maintained projecting beyond the front face of the die to form the head.

As the heading tool 20 recedes from the die 12 the ejecting rod 16 is pressed forwardly either as a separate movement or as a continuation of its previous movement. The metal in the enlargement 22 is pressed by the punch end 19 through the drawing throat 14, causing that portion of the metal contained in the area outside of the diameter of the bore 13 to be drawn into the form of a tube about the punch 18 as illustrated in Figure 4.

During this operation the excess material in the enlargement 22 is drawn by the pressure between the punch 18 and the drawing throat 14 without excessive friction and without danger of sheering or mutilating the metal since the diameter of the bore 15, and therefore the diameter of the enlargement 22, is maintained within the limits of reduction permissible in a drawing operation. For best results and with the dies and tools now commonly used for drawing I have found that the diameter of the bore 15 and the enlargement 22 should not be more than about 12½ to 15% greater than the diameter of the bore 13 and the blank 11. With certain metals and conditions this amount may be increased somewhat.

After the ejector rod 16 has moved forwardly a sufficient distance to completely draw the tubular shank, as illustrated in Figure 4, the forward movement of the rod 16 continues until the finished rivet is ejected from the die. A suitable form of stripper may be used to strip the rivet from the punch 18 upon the receding movement of the punch so that the completed rivet may drop free before the next blank is presented into alignment with the die. The removal of the rivet from the punch 18 is preferably facilitated by the provision of a slight taper or draft upon the punch as illustrated.

The completed rivet, as illustrated in Figure 6, embodies a head 23, a solid shank 24, and a hollow or tubular shank portion 25. The relative dimensions of these parts may, of course, be varied as desired.

A slightly modified construction is illustrated in Figure 5. As shown in this figure the bore 26, corresponding to the bore 15, is limited in length to the desired length of the upset 22 and terminates in a tapered shoulder 27. A bore 28 which in the construction illustrated is of the same diameter as the bore 13 extends rearwardly from the tapered shoulder 27. In this construction the ejector rod 16 may be additionally supported in the rearward portion 29 of the die. For convenience in manufacture the portion 29 of the die may be made of a separate piece rigidly clamped against the forward portion 12. This type of die forms an inwardly tapering conical end 30 upon the rear end of the upset 22. When the tubular portion 25 of the rivet shank is produced by drawing through the throat 14 a part of this taper remains upon the open end of the tubular shank of the rivet forming a point 31 as illustrated in Figure 7. A point or tapered end of this nature is desirable in the completed rivet to facilitate the entrance of the rivet into the material to be fastened. In some instances due to the proportions of the parts, there is a tendency to draw out and obliterate the tapered end 30 where the bore 28 is made of the same diameter as the bore 13. In such instances this bore 28 may be made of slightly less diameter than the bore 13 so that the tapered or conical portion 30 extends inwardly past the outer diameter of the bore 13, which becomes the outside diameter of the finished rivet shank. In this way a clearly defined point or conical taper upon the end of the rivet shank is assured.

The use of the tapered shoulder 27 is of further advantage in limiting the rearward flow of the metal into the die and therefore the volume of metal contained in the upset 22 particularly when the wall of the tubular portion of the rivet is relatively thick so that a substantial space would otherwise be left between the tool and the bore in the die.

As illustrated in Fig. 4 of the drawings, the tubular shank part 25 of the completed rivet is slightly longer than the distance from the tip of the punch end 19 to the shoulder 17. This is accomplished by providing a slight excess of metal in the enlargement or upset 22 over the amount that would be required to draw a shank exactly equal to the length of the punch 18. As the shoulder 17 moves into the drawing throat 14, the metal has been drawn out to such a length as to come into contact with the shoulder 17. The slight excess of metal remaining in the drawing throat 14 is therefore pushed or extruded by the shoulder 17 into the bore 13. That is to say the remainder of the metal in the upset 22 will be squirted forwardly through the space between the tool 18 and the bore 13 faster than the tool 18 is moving forwardly, so that the closed end of the hole in the tubular shank will be moved forwardly away from the end 19 of the tool 18. As a consequence the shank will be freed from the tool 18 and will drop out of the machine upon the completion of the forward movement of the ejector rod 16 without danger of the tubular shank freezing upon the tool 18. Preferably only sufficient extrusion is combined with the drawing to free the completed rivet from the punch so as to avoid any danger of the last part of the upset 22 being sheared from the end of the rivet instead of being extruded through the throat 14.

In the die construction illustrated in Fig. 1 the ejecting rod 16 is unsupported through the length projecting into the die. To avoid this condition when the parts are relatively long it is desirable to construct the die as illustrated in either Fig. 9 or Fig. 10.

In Figure 9 the die 12 is shown backed by a die 32 having a bore 33, of the same diameter as the bore 13, in which the ejecting rod 16 is slidably supported. This arrangement leaves a shoulder 34, and as shown in Figure 9 this shoulder is arranged to assist in trapping the metal in the bore 15, which is of advantage particularly where the wall of the tubular part is relatively thick at its junction with the solid part of the shank.

In Fig. 10 the die 12 is shown backed by a die or block 35 having a bore 36 slidably supporting the ejecting rod 16, but in this instance the shoulder formed by the face of the die 35 is well behind the point where the metal is upset into the enlargement 22.

In all of the embodiments illustrated the enlarged end on the shank which is subsequently drawn through the drawing throat and over the drawing punch, is obtained by upsetting as distinguished from extrusion. The enlargement as illustrated in Fig. 2 is obtained by simply swelling the metal into contact with the wall of the bore 15 without the necessity of sliding the metal along the bore 15. Likewise, as illustrated in Fig. 3, the metal of the enlargement 22 is swelled out to fill the corners adjacent the drawing throat 14 and the bore 15 by upsetting by the internal displacement method which merely moves the metal outwardly from the center without attempting to extrude or slide the metal along the wall of the bore 15. In some instances where only a relatively short tubular shank is desired, the further upsetting of the enlargement by the internal displacement method may be dispensed with. I am aware that efforts have heretofore been made to produce a hollow portion upon the end of a shank by driving a punch into the end and extruding or squirting the metal in the opposite direction between the wall of the punch and the wall of the bore, or by forcing the blank over the punch with similar extrusion. Such an operation, however, is extremely difficult and under many conditions impossible, and, therefore, in the preferred embodiment of the present invention I avoid any attempt to extrude the metal into the bore 15. With the die constructions illustrated in Figs. 5 and 9, any such extrusion is, of course, positively prevented by the shoulder 27 or 34.

It will be understood, of course, that the forward end 19 of the punch 18 will be made of any desired shape which will accurately limit the volume of metal upset into the enlargement 22 and at the same time will co-operate with the drawing throat 14 to form the shank without cutting or shearing the metal. Likewise the proportions of the parts may be varied to suit the particular dimensions of the rivet it is desired to make. Many other variations and modifications may be resorted to and, as stated, the invention may be utilized in the simplest form of heading machine or may be utilized in combination with any other desired operations. Likewise the invention in its broader aspects is applicable to the manufacture of any articles to be formed with tubular shank.

What I claim as my invention is:

1. The process of making a tubular member from stock of solid cross-section comprising positioning an unheaded blank in a die with its ends on opposite sides of a drawing throat, upsetting one end portion of the blank into frictional binding engagement with a substantially cylindrical recess within the die to form a cylindrical enlargement, and forcing said enlargement through said drawing throat and over a drawing punch to form a tubular portion.

2. The process of making a tubular member from stock of solid cross-section comprising positioning a length of stock in a die having a tapered drawing throat with the smaller diameter of said throat substantially equal to the diameter of said stock, upsetting one end portion of said stock into binding engagement through the major part of the axial extent of the upset with a recess in the die to form an enlargement not more than 15% greater than the smaller diameter of said throat, and forcing said upset portion through said drawing throat and over a drawing punch to form a tubular portion.

3. The process of making a tubular member from stock of solid cross-section comprising positioning an unheaded length of such stock in a die having a tapered drawing throat with the smaller diameter of the throat substantially equal to the outside diameter of said stock and with the ends of said length of stock disposed on opposite sides of said drawing throat, upsetting one end portion of said length of stock into frictional engagement with a recess in the die to form a cylindrical enlargement with its maximum diameter substantially equal to the larger diameter of said drawing throat and forcing said upset portion through said drawing throat and over a drawing punch to form a tubular portion.

4. The process of making a tubular member from stock of solid cross-section comprising positioning a blank in a die with its ends on opposite sides of a drawing throat, upsetting one end portion of the blank into engagement with a recess in said die to form a substantially cylindrical enlargement, simultaneously upsetting the other end to form a head, limiting the maximum outside diameter of said enlargement to the larger diameter of said drawing throat, and forcing said enlargement through said drawing throat and over a drawing punch to form a tubular portion.

5. The process of making a tubular member from stock of solid cross-section comprising positioning a length of such stock in a die having a tapered drawing throat with the smaller diameter of the throat substantially equal to the outside diameter of said stock and with the ends of said length of stock disposed on opposite sides of said drawing throat, upsetting one end portion of said length of stock into frictional engagement with a recess in said die to form a cylindrical enlargement of definite volume with its maximum diameter substantially equal to the larger diameter of said drawing throat simultaneously upsetting the other end to form a head, and forcing said upset portion through said drawing throat and over a drawing punch to form a tubular portion.

6. The process of making tubular rivets from elongated stock of solid cross-section comprising shearing off a length of such stock, forcing said length of stock into a die having a tapered drawing throat with its smaller diameter substantially equal to the diameter of said stock and projecting one end of said stock past said drawing throat, upsetting said one end of said stock into engagement through the major portion of the axial extent of the upset with a recess in said die to form an enlargement of definitely limited volume, and forcing said enlargement through said drawing throat and over a drawing punch.

7. The process of making tubular rivets from elongated stock of solid cross-section comprising shearing off a length of such stock forcing said length of stock into a die having a tapered drawing throat with its smaller diameter substantially equal to the diameter of said stock, projecting one end of said stock past said drawing throat, leaving the other end projecting from said die, upsetting said one end into engagement through the major portion of the axial extent of the upset with a recess in said die to form an enlargement of definitely limited volume and simultaneously upsetting said other end to form a head, forcing said enlargement through said drawing throat and over a drawing punch to form a tubular portion, and simultaneously ejecting the rivet from said die.

8. The process of making tubular rivets from elongated stock of solid cross-section comprising shearing off a length of such stock, forcing said length of stock into a die having a tapered drawing throat with its smallest diameter substantially equal to the diameter of said stock, projecting one end of said length of stock past said drawing throat, upsetting said one end into engagement with a cylindrical recess in said die to form a cylindrical enlargement having its maximum diameter substantially equal to the largest diameter of said drawing throat, and forcing said enlargement through said drawing throat and over a drawing punch to form a tubular portion.

9. The process of making tubular rivets from elongated stock of solid cross-section comprising shearing off a length of stock, forcing said length of stock into a die having a tapered drawing throat with its smallest diameter substantially equal to the diameter of said stock, projecting one end of said length of stock past said drawing throat, leaving the other end projecting from said die, upsetting said one end of said length of stock into engagement with a recess in said die to form a cylindrical enlargement having its maximum diameter substantially equal to the largest diameter of said drawing throat and simultaneously upsetting said other end to form a head, forcing said enlargement through said drawing throat and over a drawing punch to form a tubular shank and simultaneously ejecting the finished rivet from said die.

10. The process of making a tubular metal article from a length of stock of solid cross-section comprising moving said length of stock into the bore of a die of substantially the same diameter as the stock, projecting one end of said stock past a tapered drawing throat into a bore of larger diameter and against a punch, exerting pressure on the other end of said length while holding said punch stationary to move metal through said first mentioned bore and upset said one end into contact with said second mentioned bore, and moving said punch to force the upset through said drawing throat.

11. The process of making tubular articles from a length of metal stock of solid cross-section comprising moving said length of stock into the bore of a die of substantially the same diameter as the stock and projecting one end of said length past a tapered drawing throat, into a bore of larger diameter, and against a punch, leaving the other end of said length projecting from said die, exerting pressure on said other end while holding said punch stationary to move metal through said first mentioned bore and swell said one end into contact with said second mentioned bore and simultaneously swell said other end, continuing to exert pressure against said other end to upset the same into a head without further movement of metal through said first-mentioned bore, and then moving said punch through said drawing throat to draw said one end into a tube.

12. The process of making a tubular member from stock of solid cross-section comprising positioning a blank in a die with its ends on opposite sides of a drawing throat, upsetting one end portion of the blank against a punch by pressure exerted on the other end, further upsetting said one end by moving said punch into the same while said blank is held against axial movement and drawing said one end into a tube by moving said punch through said drawing throat.

13. Apparatus for making rivets including a punch and a die having its front face arranged to co-operate with said punch to form a head, said die having a substantially cylindrical bore opening through its front face, a tapered drawing throat joining said bore and a substantially cylindrical bore of larger diameter than said first-named bore behind said drawing throat, and a piercing tool in said die having a tapered point with the maximum diameter of the taper less than the diameter of said first named bore.

14. Apparatus for making rivets including a punch and a die having its front face arranged to co-operate with said punch to form a head, said die having a substantially cylindrical bore opening through its front face, a tapered drawing throat having a smaller diameter substantially equal to the diameter of said bore spaced behind said front face and joining a second bore having a diameter substantially equal to the larger diameter of said drawing throat and arranged behind said drawing throat.

15. Apparatus for making tubular articles from stock of solid cross-section including a die having an opening, a tapered drawing throat behind said opening and a bore of larger diameter than said opening behind and joining said drawing throat, and a piercing punch having a diameter smaller than said opening arranged in said bore behind said drawing throat.

16. Apparatus for making tubular articles from stock of solid cross-section including a die having an opening therein, a drawing throat behind said opening and an enlarged bore behind said drawing throat of larger diameter than said opening and a reduced bore behind said enlarged bore, an ejector rod slidably mounted in said reduced bore and having a punch projecting from the forward end thereof, said punch being smaller in diameter than said opening and having its forward end positioned adjacent the junction between said enlarged bore and said reduced bore.

17. The process of making tubular rivets from elongated stock of solid cross section comprising shearing off a length of such stock, moving said length into a die and projecting one end past a tapered drawing throat, the smaller diameter of which is substantially equal to the diameter of said stock leaving the other end projecting from said die, exerting pressure on the opposite ends of said length of stock to upset said ends, limiting the maximum diameter of the upset of said one end by engagement thereof in a cylindrical recess corresponding to the maximum diameter of said drawing throat, completing the upset of said other end into a head while preventing longitudinal displacement of said stock through said drawing throat and drawing the upset of said one end through said drawing throat and over a drawing punch.

18. The process of making an unheaded tubular metal article from a length of stock of solid cross-section including radially spreading an end of said length into contact with the wall of a die without extruding the metal along said wall, and drawing the spread portion through a reduced drawing die and over a punch to form a tubular portion.

19. The process of making a tubular rivet from a length of stock of solid cross-section including positioning said length of stock in a die with one end projecting past a tapered drawing throat and the other end projecting from said die, radially spreading said one end into contact with the wall of an enlargement in said die without extruding the metal along said wall; simultaneously upsetting said other end to form a head, and drawing said spread portion through said tapered drawing throat and over a punch to form a tubular portion.

20. The process of making a tubular member from stock of solid cross-section including moving the stock in one direction through a drawing die against a stationary punch to upset the end of the stock, advancing said punch into the upset end while holding the stock against movement in said die to further upset the end by internal displacement, and further advancing said punch to move the stock in the opposite direction through said drawing die and draw the upset end into a tube.

21. The process of making a tubular metal article from a length of stock of solid cross section including enlarging an end of said length of stock, drawing the major part of the enlarged end through a drawing die and over a drawing tool by moving said drawing tool through said drawing die, and extruding the remainder of said enlarged end through the space between said drawing die and said drawing tool so that the drawn portion is freed from said drawing tool.

22. The process of making a tubular metal article from a length of stock of solid cross section including upsetting an end of said length of stock against a drawing tool and into contact with the wall of a die, drawing the major part of the upset portion through a drawing die and over said drawing tool by moving said drawing tool through said drawing die, and extruding the remainder of said upset portion through the space between said drawing die and said drawing tool so that the drawn portion is freed from said drawing tool.

23. The process of making a tubular member from stock of solid cross section comprising positioning a blank in a die with its ends on opposite sides of a drawing throat, upsetting one end portion of the blank into engagement with a cylindrical recess in said die to form a substantially cylindrical enlargement, upsetting the other end of the blank to form a head, and forcing said enlargement through said drawing throat and over a drawing punch to form a tubular portion.

24. The process of making a tubular metal article from a length of stock of solid cross section comprising moving said length of stock into the bore of a die of substantially the same diameter as the stock, projecting one end of said stock past a tapered drawing throat into a bore of larger diameter and against a punch, exerting pressure on the other end of said length to move metal through said first mentioned bore and upset said one end against said punch into contact with said second mentioned bore, and moving said punch to force the upset through said drawing throat.

25. The process of making a tubular rivet from an unheaded length of stock of solid cross section, including positioning said length of stock in a die with its inner end projecting past a drawing throat into a recess in said die and into engagement with a drawing punch, exerting pressure upon said length of stock to upset said one end into an enlargement between the end of said drawing punch and said drawing throat without sliding or extruding the stock over the drawing punch, and forcing said enlarged end through said drawing throat and over said drawing punch to form a tubular portion.

26. The process of making a tubular metal article from a blank including a shank portion of solid cross section comprising moving said shank portion into the bore of a die of substantially the same diameter as the shank portion, projecting the free end of said shank portion past a tapered drawing throat into a cylindrical bore of larger diameter, upsetting the free end of the shank portion behind said drawing throat into contact with the wall of said cylindrical bore and drawing the upset portion through said drawing throat and over a punch to form a tubular portion.

27. The process of making a tubular metal article from a blank including a shank portion of solid cross section comprising moving said shank portion into the bore of a die of substantially the same diameter as the shank portion, projecting the free end of said shank portion past a tapered drawing throat into a cylindrical bore of larger diameter having an end wall spaced from said drawing throat, upsetting the free end of the shank portion behind said drawing throat into contact with the wall of said cylindrical bore and into contact with said end wall, and drawing the upset portion through said drawing throat and over a punch to form a tubular portion.

28. The process of making a tubular member from stock of solid cross section including upsetting the end of a piece of stock by axial movement of the stock to form an enlargement, forcing a punch into the enlargement while holding the stock against axial movement to displace metal radially outward, leaving a central recess in the enlargement, and drawing the outwardly displaced stock through a drawing die and over a punch to form a tube.

EARL R. FROST.